United States Patent
Yospe et al.

(10) Patent No.: US 8,849,780 B2
(45) Date of Patent: Sep. 30, 2014

(54) SYSTEM AND METHOD FOR AUTOMATION OF CONSISTENT LOCK MANAGEMENT

(75) Inventors: Nathan F Yospe, Glendale, CA (US); Richard T Endo, Los Angeles, CA (US); Simon D Shpilfoygel, Woodland Hills, CA (US)

(73) Assignee: SAP AG, Walldorf (DE)

( * ) Notice: Subject to any disclaimer, the term of this patent is extended or adjusted under 35 U.S.C. 154(b) by 448 days.

(21) Appl. No.: 12/610,486

(22) Filed: Nov. 2, 2009

(65) Prior Publication Data

US 2011/0106777 A1    May 5, 2011

(51) Int. Cl.
*G06F 17/30*    (2006.01)

(52) U.S. Cl.
CPC ............................... *G06F 17/30362* (2013.01)
USPC .......................................................... 707/704

(58) Field of Classification Search
CPC .......... G06F 17/3023; G06F 17/30348; G06F 9/524; G06F 17/30351; G06F 17/30365; G06F 21/577; G06F 2221/033
See application file for complete search history.

(56) References Cited

U.S. PATENT DOCUMENTS

| | | | |
|---|---|---|---|
| 5,465,363 A | 11/1995 | Orton et al. | |
| 7,210,135 B2 * | 4/2007 | McCrady et al. | 717/140 |
| 2004/0210899 A1 | 10/2004 | Somogyi | |
| 2004/0221272 A1 | 11/2004 | Wu et al. | |
| 2004/0237073 A1 | 11/2004 | Wu et al. | |
| 2004/0243792 A1 | 12/2004 | Stoodley | |
| 2007/0239943 A1 * | 10/2007 | Dice et al. | 711/147 |

* cited by examiner

*Primary Examiner* — Dinku Gebresenbet
(74) *Attorney, Agent, or Firm* — Buckley, Maschoff & Talwalker LLC

(57) ABSTRACT

A system and method for automation of consistent lock management, wherein a shared resource is accessed through an accessor object. An accessor object class includes at least one const read access function and one write access function. A const accessor object is received for read-only access of a shared resource. The compiler is enlisted to enforce lock selection.

16 Claims, 7 Drawing Sheets

SYSTEM AND METHOD FOR AUTOMATION OF CONSISTENT LOCK MANAGEMENT

BACKGROUND OF THE INVENTION

1. Field of the Invention

Embodiments of the invention described herein pertain to the field of computer systems. More particularly, but not by way of limitation, one or more embodiments of the invention enable a lock management system and method.

2. Description of the Related Art

In a multi-threaded computing environment, resource objects must be shared between multiple threads. Applications running in a multi-threaded environment must be designed to avoid conflicts due to the access of shared resources, such as memory, hardware and data. Locking is a widespread technique used to address this concern. Locking prevents the use of a shared resource by more than one operation at a time. When an operation has an exclusive lock on a shared resource, it becomes unavailable to others. Concurrency control preserves resource consistency and resolves conflicts. In the management of shared data resources, locking secures the permission to access a data item during a transaction. Unlocking removes the permissions from the data item so that other processes and operations may move forward and access the shared resource in turn.

Proper locking implementation in an application running in a multi-threaded environment is complex. On one hand, under locking in an application is problematic because problems will occur that locking and lock management are designed to avoid. On the other hand, over locking can also create problems, such as deadlocking and performance degradation. Such problems are also exacerbated by poor coding practices. Lock implementation is an important and time-consuming part of application design. Improper implementation and management of locking may result in inefficiency and errors, such as deadlocks, race conditions, hanging, poor performance, exceptions, program termination, data corruption, and many other issues. Thus, improper lock management can result in high costs in terms of debugging, support and maintenance costs.

Lock escalation policies may be used to broaden access to a resource, such as a database. For example, a resource may be unlocked when a session is accessing the resource. Alternatively, one or more sessions may have a shared lock on a resource. Typically, a shared lock is granted when the session requests read access of the resource. A session may also have an exclusive lock on a resource. Typically, an exclusive lock is required when a modification, including a deletion and addition, is made to the resource. A lock management system may include refinement to enhance efficiency and consistency. For example, a lock management system may define a method for determining the priority of sessions which request a type of lock. Furthermore, an exclusive lock may be divided up into further locking states such that modifications are first cached before being written in a writing step.

In two-phase locking techniques, shared locks are used to provide read access to multiple transactions, while exclusive access is granted for write access. In the prior art, two-phase locking techniques use a lock manager which manages locks on all data items. A lock table may also be used to store the transaction, data item locked, and lock mode.

The granularity of lock management systems may vary. In coarse-grained locking, when a session is writing to a database, all other sessions are locked out until the transaction is completed. Fine-grained locking locks a tuple or attribute. In a database, granularity can range from a single field, a record, a table, one or more disc blocks, an entire table, or an entire database. Locking helps maintain the integrity of the data in a database by ensuring that the same data or related structures to the data are not modified in two different processes or operations concurrently. A lock management system for a database may be optimized to include functionality to implement multiple granularity levels in a single database lock management system.

When collections of objects are accessed by complex programs, they all need to be locked correctly and consistently. Even when a complex lock management system is available, code reuse and development typical for software projects tends to encourage developers to take an excessively pessimistic locking approach in order to avoid incurring severe support and maintenance costs due to insufficient locking. Currently, programmers have to choose lock types based on the context of the operation. Improper lock implementation by a programmer may result in problematic compiled code with poor performance.

Typically, a simple lock management system provides straightforward application design, implementation, and debugging. However, simple lock management systems typically do handle locking efficiently. On the other hand, an optimized lock management system provides more efficient access to shared resources, such as a database. However, software development becomes more complicated, and developers may not take advantage of the optimized system because of its complexity, especially in software projects involving multiple developers.

For at least the limitations described above there is a need for a system and method for automation of consistent lock management.

BRIEF SUMMARY OF THE INVENTION

One or more embodiments of the system and method enable a computer-readable storage medium comprising computer executable instructions for automation of consistent lock management. The instructions include requesting read access to a shared resource. The shared resource may be a database component.

A const accessor object corresponding to the shared resource is received. The const accessor object obtains a read access lock on the shared resource. The accessor object class includes at least one read access function and one write access function. The read access function may be a const function. When program code attempts write access of the shared resource through the const accessor object, the result is a compiler error. The const accessor object may be destructed when the access is complete. In one or more embodiments, the const accessor object communicates with the resource access manager and the resource to unlock the resource and any dependent resources.

One or more embodiments include instructions to promote a read access lock into a write access lock. The accessor object registers with a resource access manager, wherein the resource access manager tracks and manages accessor objects. The resource access manager may correspond to a set of logically related data, such as a customer database. The shared resource is accessed through the accessor object. A promotable accessor object initially obtains a promotable read lock on the shared resource. During its lifetime, the accessor object automatically detects the first attempt to perform a write operation and automatically requests promotion of the lock to a write lock. The described procedure automatically minimizes the amount of time the underlying resource is write-locked at the entry point.

The promotable accessor object may be destructed when the access is complete. In one or more embodiments, the promotable accessor object communicates with the resource access manager and the resource to unlock the resource and any dependent resources.

One or more embodiments of the system and method for automation of consistent lock management include instructions for requesting write access to a second shared resource. A second accessor object corresponding to the second shared resource is received. The second accessor object obtains a write access lock on the second shared resource. The second shared resource is accessed through the second accessor object.

In some programming languages, on-stack access objects allow the automation of lifetime management of object locking by automatically releasing locks when accessor objects are destroyed upon going out of scope. One or more embodiments of the system and method enable a computer system for automation of consistent lock management comprising at least one computer, a database and a computer-readable medium with program instructions.

Access to an element of the database is requested. A const accessor object corresponding to the element is received, wherein an accessor object class includes at least one read access function and one write access function, and wherein a read access lock on the element is obtained by the const accessor object. At least one read access function may be a const function. The element is accessed through the accessor object. The compilation of program code attempting write access of the element through the const accessor object results in a compiler error.

The accessor object is registered with a resource access manager, wherein the resource access manager tracks and manages accessor objects. The resource access manager may correspond to a set of logically related data, including a customer database.

The instructions of the computer-readable medium may further include requesting write access to a second element. A second accessor object corresponding to the second element is received, wherein the second accessor object obtains a lock on the second element. The second element is accessed through the second accessor object. The lock may be a read access lock, and the instructions may include promoting said read access lock to a write access lock. In one or more embodiments, promotion comprises obtaining a non-const accessor object corresponding to the const accessor object.

The accessor object may be destructed when access is complete. In one or more embodiments, the accessor object communicates with the resource access manager and the element to unlock the element and any dependent resources.

By communicating with the Resource Access Manager, accessor objects can ensure that objects of finer granularity that compose the accessed object are also locked with the correct lock type. When locks are promoted, accessor objects similarly ensure that locks of and objects including the accessed object are promoted if necessary.

BRIEF DESCRIPTION OF THE DRAWINGS

The above and other aspects, features and advantages of the invention will be more apparent from the following more particular description thereof, presented in conjunction with the following drawings wherein.

DETAILED DESCRIPTION

A system and method for automation of consistent lock management will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
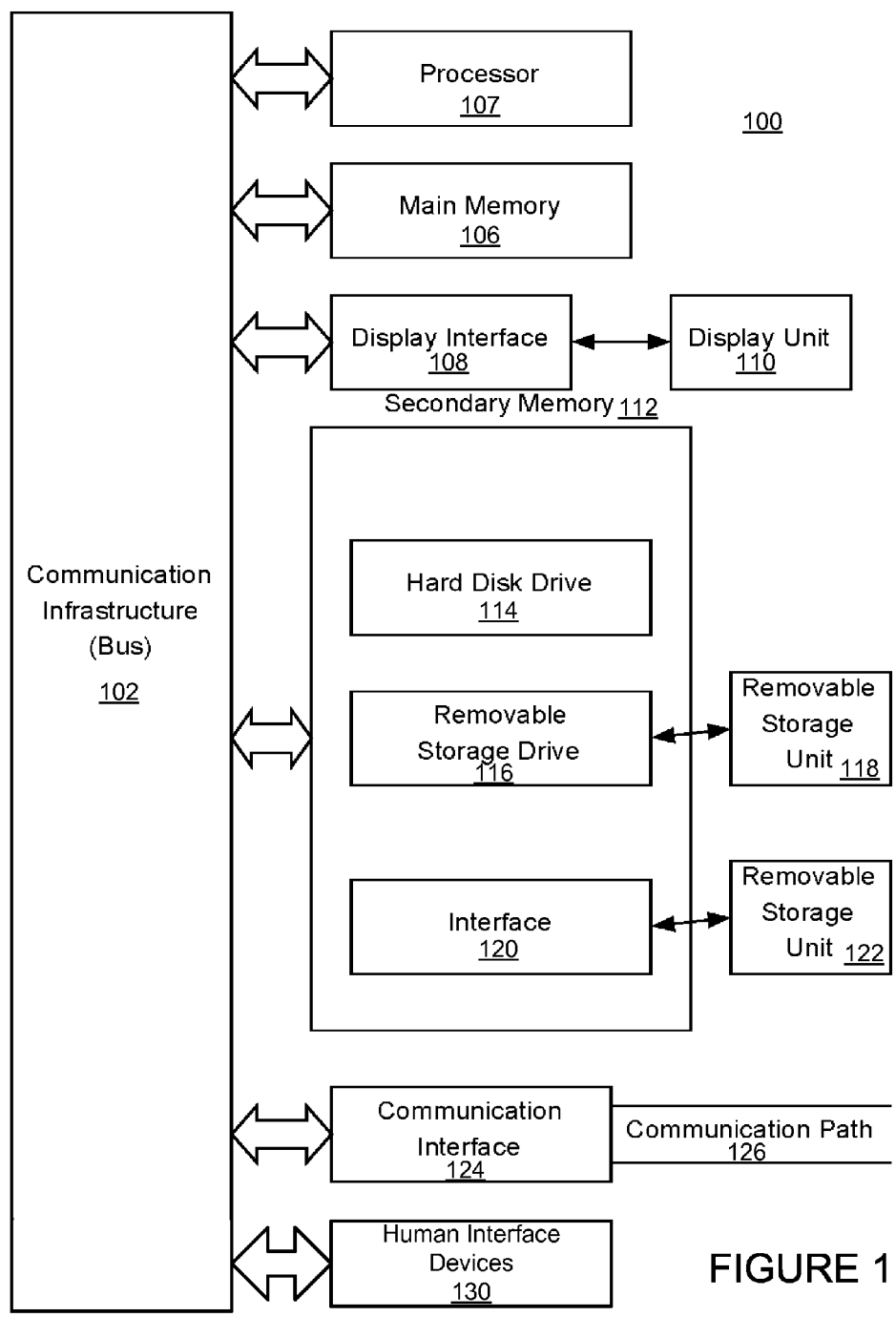
FIG. 1 illustrates an exemplary computer system in which the system and method for automation of consistent lock management may be practiced.

FIG. 1 is provided for purposes of illustrating a general-purpose computer 100 and peripherals which, when programmed as described herein, may operate as a specially programmed computer capable of implementing one or more methods, apparatus and/or systems of the invention. Processor 107 may be coupled to a bi-directional communication infrastructure such as Communication Infrastructure System Bus 102. Communication Infrastructure 102 may generally be a system bus that provides an interface to the other components in the general-purpose computer system such as Processor 107, Main Memory 106, Display Interface 108, Secondary Memory 112 and/or Communication Interface 124.

Main memory 106 may provide a computer readable medium for accessing and executed stored data and applications. Display Interface 108 may communicate with Display Unit 110 that may be utilized to display outputs to the user of the specially-programmed computer system. Display Unit 110 may comprise one or more monitors that may visually depict aspects of the computer program to the user. Main Memory 106 and Display Interface 108 may be coupled to Communication Infrastructure 102, which may serve as the interface point to Secondary Memory 112 and Communication Interface 124. Secondary Memory 112 may provide additional memory resources beyond main Memory 106, and may generally function as a storage location for computer programs to be executed by Processor 107. Either fixed or removable computer-readable media may serve as Secondary Memory 112. Secondary Memory 112 may comprise, for example, Hard Disk 114 and Removable Storage Drive 116 that may have an associated Removable Storage Unit 118. There may be multiple sources of Secondary Memory 112 and systems of the invention may be configured as needed to support the data storage requirements of the user and the methods described herein. Secondary Memory 112 may also comprise Interface 120 that serves as an interface point to additional storage such as Removable Storage Unit 122. Numerous types of data storage devices may serve as repositories for data utilized by the specially programmed computer system of the invention. For example, magnetic, optical or magnetic-optical storage systems, or any other available mass storage technology that provides a repository for digital information may be used.

Communication Interface 124 may be coupled to Communication Infrastructure 102 and may serve as a conduit for data destined for or received from Communication Path 126. A Network Interface Card (NIC) is an example of the type of device that once coupled to Communication Infrastructure 102 may provide a mechanism for transporting data to Communication Path 126. Computer networks such Local Area Networks (LAN), Wide Area Networks (WAN), Wireless networks, optical networks, distributed networks, the Internet or any combination thereof are some examples of the type of communication paths that may be utilized by the specially program computer system of the invention. Communication Path 126 may comprise any type of telecommunication network or interconnection fabric that can transport data to and from Communication Interface 124.

To facilitate user interaction with the specially programmed computer system of the invention, one or more Human Interface Devices (HID) 130 may be provided. Some examples of HIDs that enable users to input commands or data to the specially programmed computer of the invention may comprise a keyboard, mouse, touch screen devices, microphones or other audio interface devices, motion sensors or the like, as well as any other device able to accept any kind of human input and in turn communicate that input to Processor 107 to trigger one or more responses from the specially programmed computer of the invention are within the scope of the system of the invention.

While FIG. 1 depicts a physical device, the scope of the system of the invention may also encompass a virtual device, virtual machine or simulator embodied in one or more computer programs executing on a computer or computer system and acting or providing a computer system environment compatible with the methods and processes of the invention. Where a virtual machine, process, device or otherwise performs substantially similarly to that of a physical computer system of the invention, such a virtual platform will also fall within the scope of a system of the invention, notwithstanding the description herein of a physical system such as that in FIG. 1.

One or more embodiments of the invention are configured to enable the specially programmed computer of the invention to take the input data given and transform it into a source-independent server interface by applying one or more of the methods and/or processes of the invention as described herein. Thus the methods described herein are able to transform the raw input data, such as digital commands, to a source-independent server interface accepting origin-specific commands, using the system of the invention to result in an the server performing origin-specific commands arranged to preserve the independence of the, using the specially programmed computer as described herein. Particularly, the system of the invention may be programmed to acquire an object containing commands for execution and interpreting said commands in light of an origin-independent interface.

Figure 2:
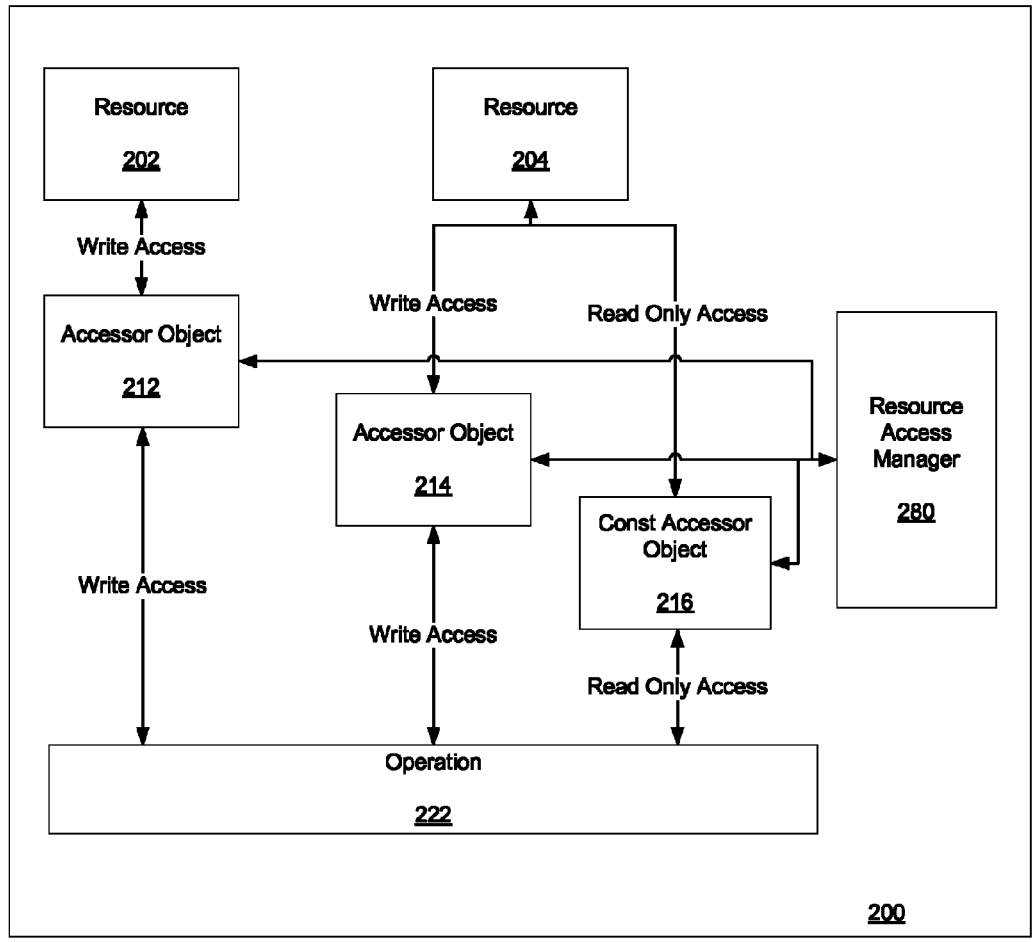
FIG. 2 is a block diagram of a system for automation of consistent lock management in one or more embodiments of the described systems and methods.

FIG. 2 is a block diagram of a system in accordance with one or more embodiments of systems and methods for automation of consistent lock management. System 200 may be implemented in a single application on a single computer, or over multiple applications and multiple computers. System 200 includes resources 202-204. Resources 202-204 are shared resource objects. Resources 202-204 may reside on the same computer system or different computer systems, such as memory, hardware or data. In one or more embodiments, resources 202-204 are data objects in a database system. Embodiments of the system and method for automation of consistent lock management may handle resources on a fine-grained level, coarse-grained level, or a combination. Each of resources 202-204 can represent a single data object or a group of data objects. A grouping of objects may be logically or physically related.

Operation 222 runs within system 200. Operation 222 requires access to resources 202-204. Access to resources 202-204 is handled through accessor objects 212-216. Access includes read access and write access. In one or more embodiments of the system, write access includes permission to read, modify, delete and add a resource. Operation 222 communicates with accessor objects 212-216 to request access to resources 202-204. From the standpoint of the developer creating operation 222, accessor objects 212-216 may be viewed as handles or wrappers to resource 202-204.

Accessor objects 212-216 may comprise an identifier which identifies the resource associated with each accessor object. The identifier for the resource may comprise any variable type, such an integer, double, character, float, string, vector, or an object, and/or at least one pointer to any such type. The accessor object may also comprise multiple variables or data structures for identifying the associated access-controlled resource. Operation 222 may request an accessor object corresponding to a resource using an identifier for the specified resource. For example, an operation may request an accessor object from another component of the system, such as the Resource Access Manager, or any other component of system 200, including components not described in this application. Alternatively, operation 222 may directly instantiate a new accessor object using the identifier for the resource. Operation 222 may either be provided with a new instance of an accessor object or an existing accessor object.

Accessor objects 212-216 communicate with Resource Access Manager 280 and resource objects 202-204. By communicating with Resource Access Manager 280 and resources 202-204, resources 202-204 are able to lock resources 202-204 with the correct lock type suitable for the requested access by operation 222.

Accessor objects 212-216 and locks obtained via accessor objects 212-216 are tracked and managed by Resource Access Manager 280. In one or more embodiments of the system, one Resource Access Manager 280 is used for each set of logically related resources, such as a subset of database containing related data. In one or more embodiments, the shared resources are contained in a master database, and one Resource Access Manager 280 is used for each customer database stored within the master database.

In one or more embodiments of the system and method for automation of consistent lock management, a const accessor object 216 is used when read only access to resource 204 is required. This allows the compiler to be enlisted in the automation of consistent lock management. For example, if a developer writes code for operation 222 which requests read-only const accessor object 216 to perform a write access action on resource 204, the accessor object may be programmed such that the compiler will not compile the code.

The accessor object may also be programmed such that the lock is released upon the destruction of the object upon going out of scope, automating lock release when supported by the programming language in which the accessor object is implemented.

Figure 3:
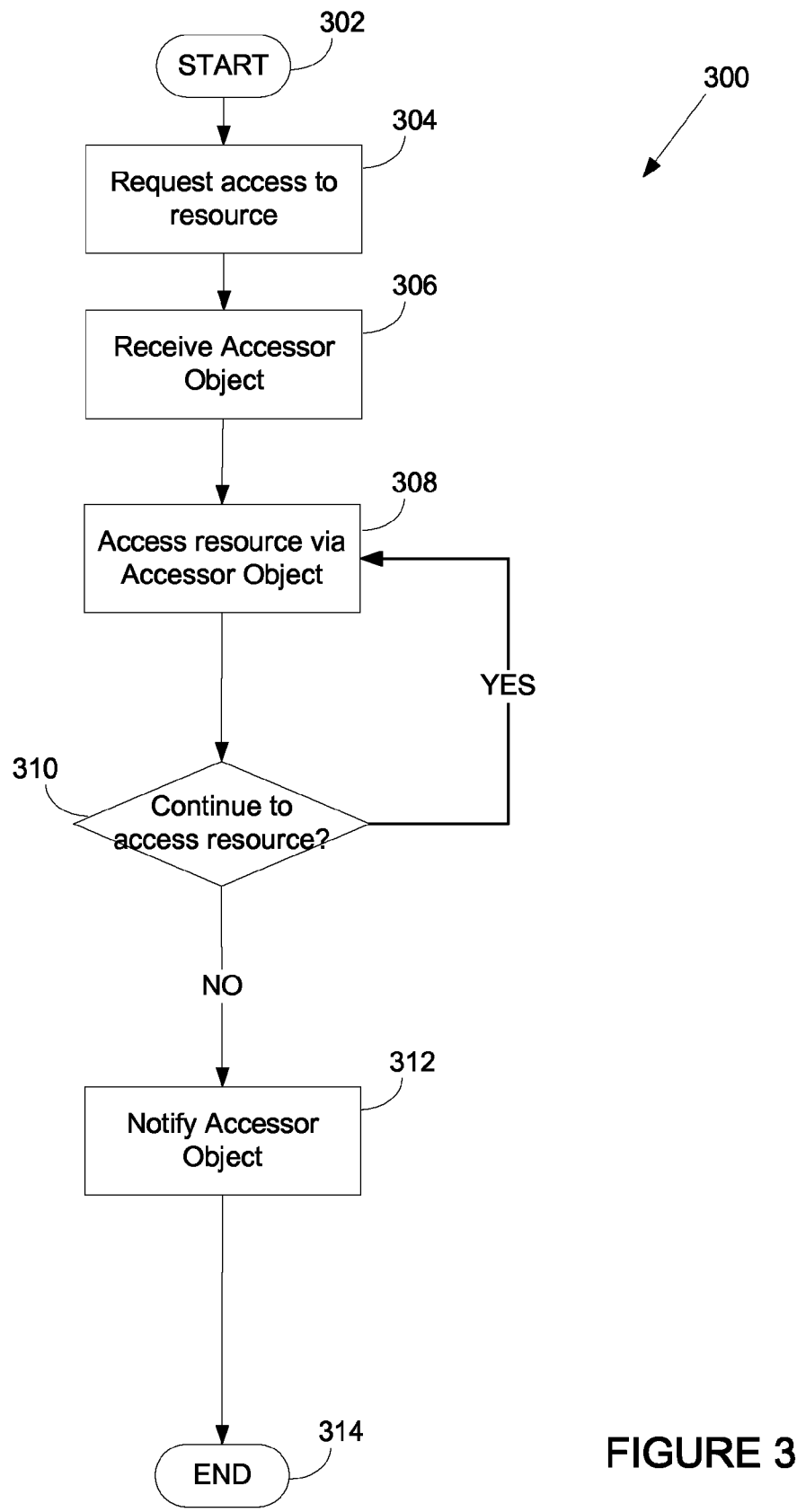
FIG. 3 provides a diagram of process steps taken in an operation in accordance with one or more embodiments of the described systems and methods for automation of consistent lock management.

FIG. 3 provides a diagram of process steps for an operation in accordance with one or more embodiments of systems and methods for automation of consistent lock management. Process 300 starts at step 302. Processing continues to step 304, where the operation requests access to a resource.

Processing continues to step 306, where the operation receives an accessor object which corresponds to the resource. The accessor object will communicate with the Resource Access Manager and the resource to lock the resource and its subcomponents with the right lock types based on the request type of the operation in step 304. The Resource Access Manager may use its knowledge of existing accessor objects to optimize locking. In one or more embodiments of the system, one Resource Access Manager is used for each set of logically related resources, such as a subset of database containing related data. In one or more embodiments, the shared resources are contained in a master database, and one Resource Access Manager is used for each customer database stored within the master database.

The operation may create an accessor object based on an identifier for the resource. The identifier for the resource may comprise any variable type, such an integer, double, character, float, string, vector, or an object, and/or at least one pointer to any such type. The accessor object may also comprise multiple variables or data structures for identifying the associated access-controlled resource. Alternatively, the operation may request the accessor object corresponding to the resource using an identifier for the resource. For example, the operation may request an accessor object from the Resource Access Manager, or another part of the system not described in this application. The operation may be provided a new instance of an accessor object or an existing accessor object.

Processing continues to step 308, where the operation accesses the resource via the resource object. For example, the operation may call functions of the resource object which, provide access to the resource. In one or more embodiments of the system and method for automation of consistent lock management, a const accessor object is received by the operation when read-only access to the resource is requested. This allows the compiler to be enlisted in the automation of consistent lock management. When the accessor object is properly designed, the compiler will not compile a program which requests a read-only (const) accessor object to perform an operation outside of this permission.

Processing continues to decision step 310, where it is determined continued access to the resource is required. If continued access to the resource is required, processing continues to step 308. Otherwise, processing is continued to step 312, where the operation notifies the accessor object that access is complete. In one or more embodiments, the accessor object communicates with the Resource Access Manager and the resource to unlock the resource and any dependent resources. The accessor object may also destruct after receiving the notification at 312 and properly notifying any other system components, such as the Resource Access Manager that access to the resource specific to this accessor object is no longer required by the specific operation. Processing continues to step 314, where process 300 terminates.

Figure 4:
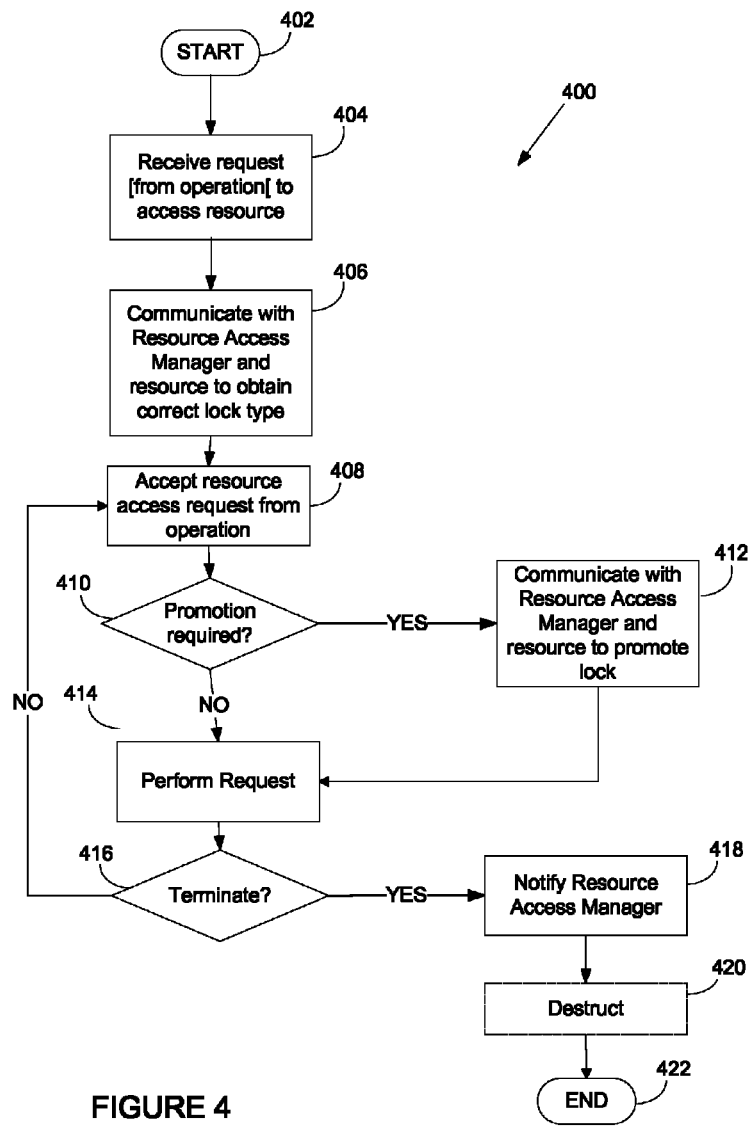
FIG. 4 provides a diagram of process steps taken by an accessor object in accordance with one or more embodiments of the described systems and methods for automation of consistent lock management.

FIG. 4 provides a diagram of process steps for an accessor object in accordance with one or more embodiments of systems and methods for automation of consistent lock management. At the start of process 400, an operation has received the accessor object described. Process 400 starts at step 402 and continues to step 404. At step 404 the accessor object receives a request from an operation to access a resource.

Processing continues to step 406, where the accessor object communicates with the Resource Access Manager and the resource to obtain the correct lock type to access the resource. In one or more embodiments of the system, one Resource Access Manager is used for each set of logically related resources, such as a subset of database containing related data. In one or more embodiments of the invention, the shared resources are contained in a master database, and one Resource Access Manager is used for each customer database stored within the master database.

In one or more embodiments of the method, the operation may only request a read access if the accessor object is a const accessor object. Otherwise, the program code for the operation would fail to compile. To ensure that the program code compiles, the operation must request and receive the proper type of accessor object in steps 304-306. Processing continues to step 408, where the request is accepted. Note that this is not a decision step because only code comprising requests which will be accepted will compile.

Processing continues to decision step 410, where it is determined whether the current lock type is adequate for the accessor object to perform the resource access request from the operation, or if the current lock needs to be promoted. This decision is relevant to the case where of a non-const accessor object, which is capable of receiving both read and write requests from the operation. If the current lock type is adequate, processing continues to step 414. Otherwise, if the current lock type needs to be promoted, processing continues to step 412, where the accessor object communicates with the Resource Access Manager and the resource to promote the lock that the accessor object has on the resource. A person of ordinary skill in the art would appreciate that there are many existing techniques to optimize lock promotion as described in step 412. Processing continues to step 414.

At step 414, the accessor object performs the request by accessing the resource and returning or otherwise communicating the result of the access to the operation. For example, the accessor object may execute functions calls initiated by the resource object.

Processing continues to decision step 416, where it is determined whether to terminate the accessor object. For example, the accessor object may be terminated by destruction when access is no longer required by the operation. In other embodiments, termination does not necessarily result in the termination of the accessor object, only the relationship between the accessor object and the operation. If it is determined that the accessor object may be terminated, processing continues to step 418. Otherwise, processing continues to step 408 to begin the processing of another resource access request from the operation.

At step 418, the accessor object notifies the Resource Access Manager to end the relationship between the accessor object and the operation. In one or more embodiments, the accessor object communicates with the Resource Access Manager and the resource to unlock the resource and any dependent resources. Processing continues to optional step 420, where the accessor object is destructed after properly notifying any other system components, such as the Resource Access Manager that access to the resource specific to this accessor object is no longer required by the specific operation. Processing continues to step 422, where process 400 terminates.

Figure 5:
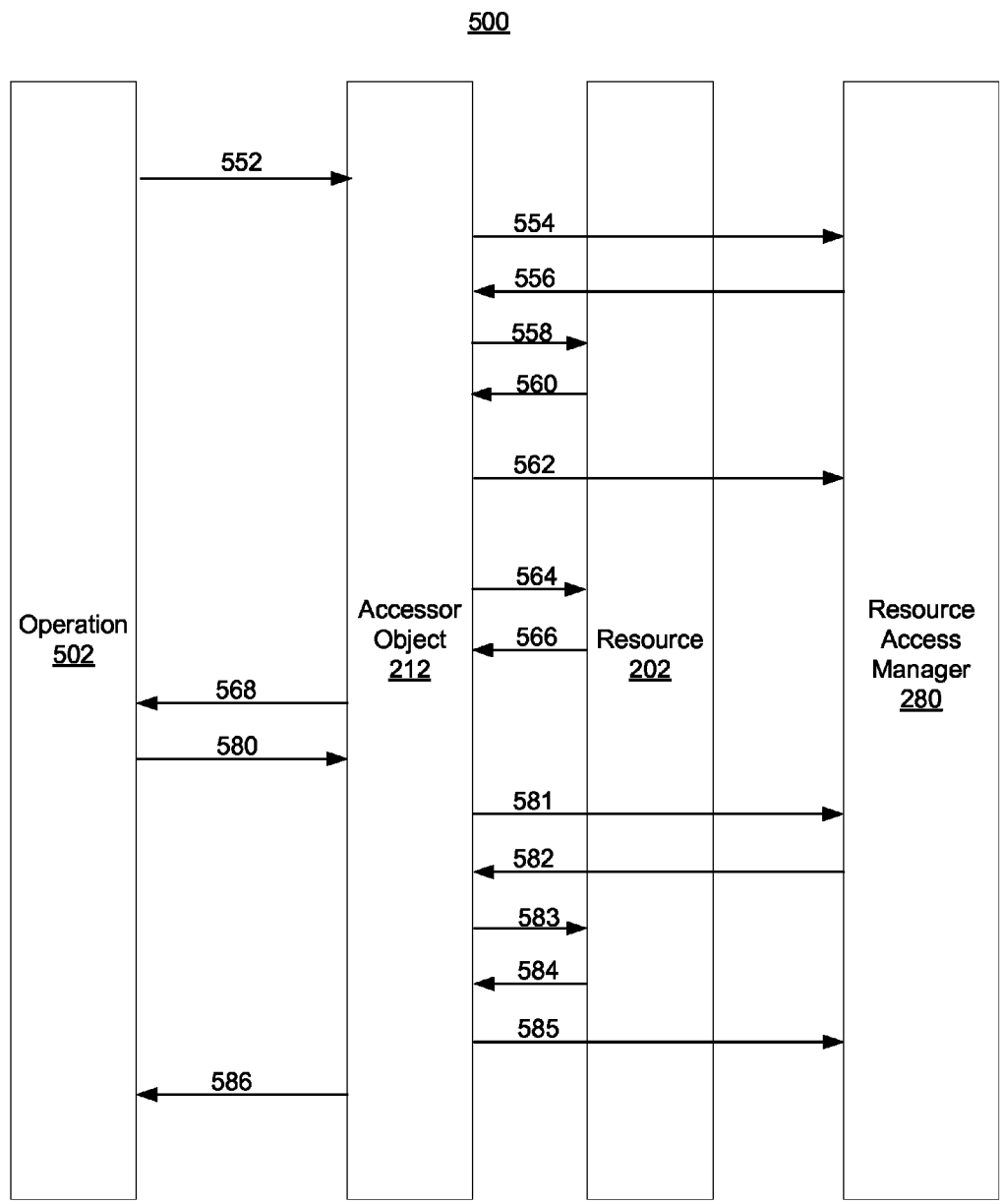
FIG. 5 provides an interaction diagram in accordance with one or more embodiments of the described systems and methods for automation of consistent lock management.

FIG. 5 provides an interaction diagram in accordance with one or more embodiments of systems and methods for automation of consistent lock management. At step 552, operation 502 requests access to resource 202 through accessor object 212. In one or more embodiments of the system and method, the system is configured such that the compiler enforces the request type, limiting the request to a read access request for a const accessor object.

At step 554-556, accessor object 212 communicates with Resource Access Manager 280 to obtain an appropriate lock for the access requested by operation 502. In one or more embodiments of the system, one Resource Access Manager 280 is used for each set of logically related resources, such as a subset of database containing related data. In one or more embodiments of the invention, the shared resources are contained in a master database, and one Resource Access Manager 280 is used for each customer database stored within the master database.

At step 558, resource 202 is locked by accessor object 212. At step 560, resource 202 responds to lock request 558 with a confirmation. At step 562, Resource Access Manager 280 is notified by accessor object 212 that resource 202 is now locked, giving operation 502 safe access to resource 202 through accessor object 212.

At steps 564-566, accessor object 212 communicates with resource 202 to perform the request from operation 502 (which was communicated at step 552) from operation 502. At step 568, any appropriate response is returned or otherwise communicated to operation 502 by accessor object 212.

When operation 502 is ready to release the lock on resource 202 through accessor object 212, operation 502 sends a release request to accessor object 212. Accessor object 212 communicates with Resource Access Manager 280 at steps 581-582 to update Resource Access Manager 280. At steps 583-584, accessor object 212 communicates with resource 202, releasing the lock on resource 202. At step 585, Resource Access Manager 280 is notified that resource 202 is unlocked. At step 586, accessor object 212 returns control to operation 502.

Figure 6:
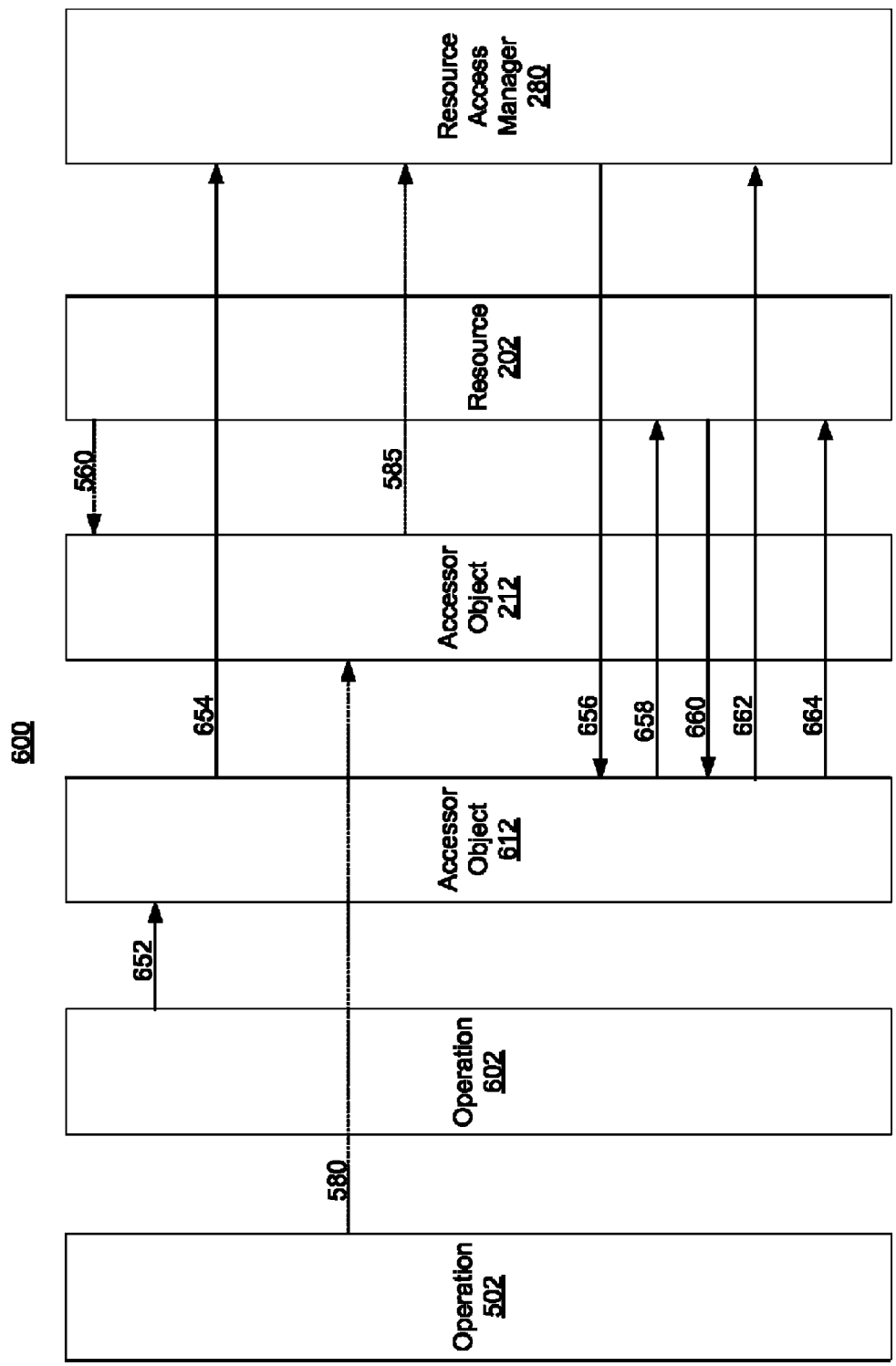
FIG. 6 provides an interaction diagram in accordance with one or more embodiments of the described systems and methods for automation of consistent lock management.

FIG. 6 provides an interaction diagram in accordance with one or more embodiments of systems and methods for automation of consistent lock management. FIG. 6 illustrates steps for operation 602 to access resource 202 through accessor object 612 when the process is initiated before operation 502 has released the lock on resource 202 through accessor object 212. FIG. 6 describes a situation where operation 502 and operation 602 both require mutually exclusive access to resource 202. Steps involving operation 502 from FIG. 5 are shown in dotted lines to indicate an exemplary order of these steps with reference to steps 652-664 involving operation 602.

At step 652, operation 602 requests access to resource 202 through accessor object 612. In one or more embodiments of the system and method, the system is configured such that the compiler enforces the request type, limiting the request to a read access for a const accessor object.

At step 654, accessor object 212 communicates with Resource Access Manager 280 to obtain an appropriate lock for the access requested by operation 502. In one or more embodiments of the system, one Resource Access Manager 280 is used for each set of logically related resources, such as a subset of database containing related data. In one or more embodiments of the invention, the shared resources are contained in a master database, and one Resource Access Manager 280 is used for each customer database stored within the master database.

Resource Access Manager 280 successfully responds to accessor object at 612 at step 656, indicating that accessor object 612 may proceed with the locking process. Although step 656, which communicates a success, occurs after step 585, one of ordinary skill in the art would appreciate that Resource Access Manager may notify accessor object 612 before step 585. For example, Resource Access Manager 280 may notify accessor object 612 of any other synchronization event, such as an expected waiting period or a failure to obtain a lock at the time of the request. Likewise, accessor object 612 may notify operation 602 of such events.

At step 658, accessor object 612 requests of resource 202 that it lock. At step 660, resource 202 confirms to 612 that it is locked. At step 662, Resource Access Manager 280 is notified by accessor object 212 that it locked resource 202, giving operation 602 safe access to resource 202 through accessor object 612. At step 664, accessor object 612 forwards request 652 to the resource.

Figure 7:
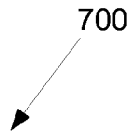
FIG. 7 provides pseudocode generally describing objects in accordance with one or more embodiments of the described systems and methods for automation of consistent lock management.

FIG. 7 provides pseudocode generally describing class objects in accordance with one or more embodiments of systems and methods for automation of consistent lock management. FIG. 7 shows exemplary high-level pseudocode describing one or more implementations of a system and method for automation of consistent lock management which take advantage of native object-level modifiability controls provided by some object-oriented programming languages to implement compiler-enforced lock management. A person of skill in the art would recognize that FIG. 7 merely provides an outline of a portion of a system and method for automation of consistent lock management, wherein the system and method take advantage of native object-level modifiability controls provided by some object-oriented programming languages to implement compiler-enforced lock management.

Pseudocode 700 includes an operation described in the main function at lines 702-712. The main function comprises an exemplary usage of accessor objects to access one or more shared resources in one or more embodiments of a system which implements the automation of consistent lock management. At line 704, ConstAccessor a1 is instantiated. The value of a1 is set to the value returned by function GetConstAccessor( ) In exemplary pseudocode at line 704, GetConstAccessor is passed a string, "list of fields". One or more embodiments of GetAccessor( ) returns an Accessor based on arguments comprising information which identifies a shared resource. ConstAccessor a1 is used by the operation (main( )) to safely access the identified shared resource. Information which identifies the shared resource may comprise any variable type, such an integer, double, character, float, string, vector, or an object, and/or at least one pointer to any such type. Multiple variables or data structures may also be used for identifying the associated access-controlled resource. The identifying information may include relational or other indexes which may identify a shared resource within a database. The identified resource may vary in scale in granularity. Although a string comprising a list of fields is described at line 704, any variable type and structure may be used.

At line 706, ConstAccessor a1 is used by the operation (main( )) to access the shared resource corresponding to ConstAccessor a1 by using a const function of Accessor, GetData( ). The Accessor class comprises at least one const function which provides read access to the shared resource. A compiler will accept the use of a read access function with either a ConstAccessor object or an Accessor object. Before read access of the shared resource, ConstAccessor a1 ensures that a read lock on the shared resource has been obtained. ConstAccessor a1 may lock the resource upon creation of ConstAccessor a1.

At line 708, Accessor a2 is instantiated. The value of a2 is set to the value returned by function GetAccessor( ). In exemplary pseudocode at line 708, GetAccessor is passed a string, "list of columns". One or more embodiments of GetAccessor( ) returns an Accessor based on arguments comprising information which identifies a shared resource. Accessor a2 is used by the operation (main( )) to safely access the identified shared resource. Information which identifies the shared resource may comprise any variable type, such an integer, double, character, float, string, vector, or an object, and/or at least one pointer to any such type. Multiple variables or data structures may also be used for identifying the associated access-controlled resource. The identifying information may include relational or other indexes which may identify a shared resource within a database. The identified resource may vary in scale in granularity. Although a string comprising a list of columns is described at line 708, any variable type and structure may be used.

At line 710, Accessor a2 is used by the operation (main( )) to access the shared resource corresponding to Accessor a2 by using a const function of Accessor, GetData( ). The Accessor class comprises at least one const function which provides read access to the shared resource. A compiler will accept the use of a read access function with either a ConstAccessor object or an Accessor object. Before read access of the shared resource, Accessor a2 ensures that a read lock on the shared resource has been obtained. Accessor a2 may lock the resource with an initial level of locking upon creation of Accessor a2. In one or more embodiments, the initial level of locking is read access locking.

At line 710, Accessor a2 is used to access the shared resource corresponding to Accessor a2 by using a function of Accessor which enables write access, ModifyData( ). The Accessor class comprises at least one function which provides write access of the shared resource to the shared resource. A compiler will only accept programming code involving access of a non-const function when the access is through an Accessor object. When program code attempts write access of the shared resource through a ConstAccessor object, a compiler error occurs. This leads to the automation of consistent lock management by taking advantage of native object-level modifiability controls to implement compiler-enforced lock management.

Function GetConstAccessor("resource") at line 714 returns a ConstAccessor object, as requested. Function GetAccessor("resource") at line 716 returns an Accessor object, as requested. Functions GetConstAccessor( ) and GetAccessor( ) allow the main( ) operation to access shared resources associated with the Accessor or ConstAccessor object returned. Both GetConstAccessor( ) and GetAccessor( ) take arguments comprising information which identifies a shared resource. Information which identifies the shared resource may comprise any variable type, such an integer, double, character, float, string, vector, or an object, and/or at least one pointer to any such type. Multiple variables or data structures may also be used for identifying the associated access-controlled resource. The identifying information may include relational or other indexes which may identify a shared resource within a database. The identified resource may vary in scale in granularity.

The const function Accessor::GetData( ) appears at line 718. The function Accessor::ModifyData( ) appears at line 720. A compiler will allow access of a const read access function of Accessor by either a ConstAccessor object or an Accessor object. However, a compiler will only allow access of a write access function by an Accessor object, provided that the write access function is not a const function. Before accessing the shared resource, ConstAccessor objects and Accessor objects ensure that a proper lock on the shared resource has been obtained.

The function ModifyData( ) includes promoteRead( ) at line 722 and modify( ) at line 724. In one or more embodiments, even though an Accessor object handles both read and write access of a shared resource, the Accessor object will only obtain a write lock when it is required to perform a modification on the shared resource. For example, when a const (read) function of Accessor a2 is called at line 710, only a read lock is obtained by Accessor a2. When a non-const (write) function "ModifyData( )" of Accessor a2 is called at line 712, promoteRead( ) at line 722 executes before modify( ). PromoteRead( ) includes code which checks the lock type and promotes the lock on the shared resource, if necessary before modify( ) performs the write-access operation on the shared resource. A person of skill in the art would recognize that, functions promoteRead( ) and modify( ) are used to represent blocks of programming instructions which perform the tasks described, the programming instructions embodied by promoteRead( ) and modify( ) may be implemented inline within ModifyData( ).

Line 717 describes a Constructor for an Accessor object. Line 726 describes a Destructor for an Accessor object. In one or more embodiments, each Accessor and const Accessor object notifies a resource access manager of its creation, destruction, and changes in lock status. In one or more embodiments, the shared resources are contained in a master database, and one Resource Access Manager is used for each customer database stored within the master database.

In one or more embodiments of the systems and methods for automation of consistent lock management, an object-oriented programming language used to implement the pseudocode described in FIG. 7. ConstAccessor and Accessor objects may be defined a single class. A keyword, such as the "const" keyword of C++, may be utilized to implement features described in FIG. 7 which take advantage of native object-level modifiability controls provided by some object-oriented programming languages to implement compiler-enforced lock management.

While the invention herein disclosed has been described by means of specific embodiments and applications thereof, numerous modifications and variations could be made thereto by those skilled in the art without departing from the scope of the invention set forth in the claims.

What is claimed is:

1. A non-transitory computer-readable storage medium comprising computer executable instructions which when executed cause a processor to perform a method for automation of consistent lock management, said instructions comprising:
   requesting read access to a shared resource;
   receiving a first type of accessor object corresponding to said shared resource, wherein an accessor object class of said first type of accessor object comprises at least one read access function, and wherein said first type of accessor object obtains a read access lock on said shared resource;
   registering said first type of accessor object with a resource access manager, wherein said resource access manager tracks and manages accessor objects;
   accessing said shared resource through said first type of accessor object;
   requesting write access to a second shared resource;

receiving a second type of accessor object corresponding to said second shared resource, wherein said second type of accessor object obtains a write access lock on said second shared resource;

accessing said second shared resource through said second type of accessor object, wherein a second accessor object class comprises at least one write access function;

preventing code compilation for code operations that request the first type of accessor object to perform a write access function by programming said first type of accessor object prior to compile time;

detecting an attempt to perform a write operation on said first type of accessor object; and promoting said read access lock to a write access lock, wherein said promoting comprises obtaining another second type of accessor object corresponding to said first type of accessor object.

2. The non-transitory computer-readable storage medium of claim 1, wherein said resource access manager corresponds to a set of logically related data.

3. The non-transitory computer-readable storage medium of claim 2, wherein said set of logically related data is a customer database.

4. The non-transitory computer-readable storage medium of claim 1, wherein said shared resource is a database component.

5. The non-transitory computer-readable storage medium of claim 1, wherein said at least one read access function is a const function.

6. The non-transitory computer-readable storage medium of claim 1, wherein said first type of accessor object further communicates with the resource access manager and the resource to unlock the resource and any dependent resources.

7. The non-transitory computer-readable storage medium of claim 6, wherein said first type of accessor object is destructed when access is complete.

8. The non-transitory computer-readable storage medium of claim 1, wherein said resource access manager correctly locks objects of finer granularity with a proper lock type, wherein said shared resource comprises said objects of finer granularity.

9. The computer-readable storage medium of claim 1, further including the step of programming the first type of accessor object to release the read access lock upon the first type of accessor object going out of scope.

10. A computer system for automation of consistent lock management, the system comprising:

at least one computer having a processor;
a database in communication with the processor; and
a non-transitory computer-readable medium comprising instructions which when executed cause the processor to perform a method, said instructions comprising:
requesting access to an element of said database;
receiving a first type of accessor object corresponding to said element, wherein an accessor object class of said first type of accessor object includes at least one read access function and one write access function, and wherein a read access lock on said element is obtained by said first type of accessor object;
registering said first type of accessor object with a resource access manager, wherein said resource access manager tracks and manages accessor objects;
accessing said element through said first type of accessor object;
requesting write access to a second element;
receiving a second type of accessor object corresponding to said second element, wherein said second type of accessor object obtains a lock on said second element;
accessing said second element through said second type of accessor object;
preventing code compilation for code operations that request the first type of accessor object to perform a write access function by programming said first type of accessor object prior to compile time;
promoting said read access lock to a write access lock, wherein said promoting comprises obtaining another second type of accessor object corresponding to said first type of accessor object.

11. The computer system of claim 10, wherein said resource access manager corresponds to a set of logically related data.

12. The computer system of claim 11, wherein said set of logically related data is a customer database.

13. The computer system of claim 10, wherein said at least one read access function is a const function.

14. The computer system of claim 10, wherein said first type of accessor object is destructed when access is complete.

15. The computer system of claim 10, wherein said first type of accessor object communicates with the resource access manager and the element to unlock the element and any dependent resources.

16. The computer system of claim 10, further wherein said instructions further include programming the first type of accessor object to release the read access lock upon the first type of accessor object going out of scope.

* * * * *